United States Patent
Carson et al.

(10) Patent No.: US 10,645,076 B1
(45) Date of Patent: May 5, 2020

(54) AUTOMATIC IDENTITY MANAGEMENT WITH THIRD PARTY SERVICE PROVIDERS

(71) Applicant: Capital One Services, LLC, McLean, VA (US)

(72) Inventors: Matthew Carson, Washington, DC (US); Kevin Nieman, Vienna, VA (US); Michael Chen, Vienna, VA (US); Kelly Ripple, Herndon, VA (US); Seth Wilton Cottle, Reston, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/534,823

(22) Filed: Aug. 7, 2019

(51) Int. Cl.
*G06F 21/00* (2013.01)
*H04L 29/06* (2006.01)

(52) U.S. Cl.
CPC ........ *H04L 63/083* (2013.01); *H04L 63/0884* (2013.01); *H04L 63/102* (2013.01); *H04L 2463/082* (2013.01)

(58) Field of Classification Search
CPC ... H04L 63/0815; H04L 67/306; H04L 63/08; H04L 63/0807; H04L 63/102; H04L 63/105; H04L 67/02
See application file for complete search history.

(56) References Cited

U.S. PATENT DOCUMENTS

| | | | |
|---|---|---|---|
| 9,106,615 B2 | 8/2015 | Grossman | |
| 9,767,482 B1 | 9/2017 | Cooper et al. | |
| 10,019,588 B2 | 7/2018 | Garcia et al. | |
| 2005/0154913 A1* | 7/2005 | Barriga | G06F 21/33 726/4 |
| 2013/0227646 A1* | 8/2013 | Haggerty | H04L 63/0853 726/3 |
| 2017/0140174 A1 | 5/2017 | Lacey et al. | |

* cited by examiner

*Primary Examiner* — Ghazal B Shehni
(74) *Attorney, Agent, or Firm* — Sterne, Kessler, Goldstein & Fox P.L.L.C.

(57) ABSTRACT

Disclosed herein are system, method, and computer program product embodiments for updating identification information of a user with service providers. An embodiment operates by a computing device sending a first piece of identification information describing a user to a service provider requiring a credential to update a user profile unique to the user. Upon receiving an indication that the piece of identification information sufficiently describes the user, the computing device generates an identifier unique to the particular user to identify the user when the computing device communicates with the service provider. Thereafter, the computing device sends an instruction to the service provider to update their user profile with a second piece of identification information. With the request, the computing device sends the identifier unique to the user, which allows the service provider to bypass the user credential and update the user profile with the second piece of identification information.

18 Claims, 9 Drawing Sheets

Service Provider

| | First Name | Middle Name | Last Name | Phone Number | City, State | Account Number | First Unique ID # | Second Unique ID # |
|---|---|---|---|---|---|---|---|---|
| 202A | Charles | | Smith | | Detroit, MI | 1A1 | 4DDD | 4BBB |
| 202B | Edmond | | Gapsoschkin | | Indianapolis, IN | 1B1 | 4DDD | |
| 202C | Caroline | | Herschel | 333-444-5555 | Washington, DC | 1C1 | 6DDD | 6BBB |

| Focus   Up Next   My Accounts          Connie Parker 👤 ˅

Profile                                          [Share Profile] ← 302

👤  Greeting Name
    Connie                                         ✎

ADDRESS

1007 Mountain Drive, Gotham, GT 12345              ✎

PERSONAL PHONE

Mobile
(301) 867-5309 ⓘ                                   ✎

Home
(XXX) XXX-XXXX                                     ✎

Work
(XXX) XXX-XXXX                                     ✎

EMAIL connie.parker@gmail.com                            ✎

⊕ Add an Email

EMPLOYMENT

Employed
Employed                                           ✎

Job Title
In-house Philosopher                               ✎

Annual Income
$142,000.00                                        ✎

NOTIFICATION

Automated SMS ⓘ                                   ⬤

Who Would You Like to Share Your Profile With?

Select which companies you would like to share your most up-to-date profile information with.

☐ Hearth Properties ☐ Heelo
☐ Green Energy ☐ Lighthouse Insurance

What Information Would You Like to Share?

Select which companies you would like to share your most up-to-date profile information with.

☐ First & Last Name ☐ Address
☐ Mobile Phone ☒ Home Phone
☒ Work Phone ☐ Email Address
☐ Employment Status ☐ Job Title
☐ Annual Income

AUTOMATIC IDENTITY MANAGEMENT WITH THIRD PARTY SERVICE PROVIDERS

BACKGROUND

Service providers are increasingly providing online services for users. For example, Netflix provides an online service that permits users to stream movies and television programs. Likewise, Amazon provides an online service that permits users to purchase goods, Facebook provides an online service that permits users to network socially, and banking institutions provide online services that permit users to perform financial transactions.

To provide services, service providers create user profiles to store identification information of the users. User profiles may include personal data associated with a specific user. As such, identification information may include personal data that is unique to the specific user and assists in identifying the specific user. For example, identification information may include an email address, a primary and secondary residence, a phone number, and a social security number, just to name a few examples. Thus, each service provider may maintain its own independent database of user profiles to store identification information applicable to its service. And the service providers may have different schemas and have different unique identifiers to identify specific users.

Over time, users may need to update identification information for various reasons. For example, a user may have moved to a different residence. Similarly, a user may have changed their phone number or email address. In each of these instances, users may want to update their user profiles for the services that they utilize.

Because users use many service providers, users have many user profiles stored with different service providers. Currently, when users want to update their identification information, they need to update their user profile for each service provider. To update them, the users may need to enter different credentials for each service provider. This can be cumbersome and very time intensive.

BRIEF DESCRIPTION OF THE DRAWINGS

The accompanying drawings are incorporated herein and form a part of the specification.

FIGS. 2A and 2B illustrate example data stored in user profiles maintained by a backend server and service provider illustrated in FIG. 1, according to some embodiments.

FIGS. 3A-3D illustrate example user interfaces of a computer application installed on user device illustrated in FIG. 1, according to some embodiments.

In the drawings, like reference numbers generally indicate identical or similar elements. Additionally, generally, the left-most digit(s) of a reference number identifiers the drawing in which the reference number first appears.

DETAILED DESCRIPTION

Provided herein are system, apparatus, device, method and/or computer program product embodiments, and/or combinations and sub-combinations thereof, for automatically updating identification information of a user with service providers. In an example embodiment, a backend server managed by an entity (e.g., a banking institution) may store a profile unique to a user that includes identification information unique to the user. Backend server may receive a request from a user to update a service provider with identification information. In response, the backend server may send a request to the service provider to update identification information of the user. The request may include a piece of identification information describing the user.

After receiving confirmation from the service provider that the piece of identification information sufficiently describes the user in their profile of the user, the backend server generates an identifier unique to the user to communicate with the service provider with identification information for the user. The backend server may now send updated identification information of the user to the service provider, along with the identifier unique to the user, to the service provider. By receiving the identifier unique to the user, the service provider may bypass any user credentials (e.g., a user name and password) unique to the service provider and automatically update their profile of the user with the updated identification information.

Similarly, when the service provider would like updated identification information of the user, the service provider may send the request for the updated identification information, along with the identifier unique to the user, to the backend server. Based on the identifier unique to the user, the backend server may automatically identify the user and present an option to the user to update identification information with the service provider.

In addition to being more efficient and less cumbersome for the user, embodiments disclosed herein provide various other technical improvements. For example, by the backend server being a trustworthy source, the disclosed embodiments enable a direct and trusted communication between the backend server and the service providers for each user. Along these lines, by generating a unique connection between the backend server and the service providers for each user, the disclosed embodiments allow the backend server and service providers to more quickly identify users and update their profiles with identification information, thereby increasing efficiency. Likewise, the backend server and service providers process fewer requests, and the processed requests do not include internal identifiers unique to the users, thereby decreasing unnecessary processing power/time and storing less stale information.

Figure 1:
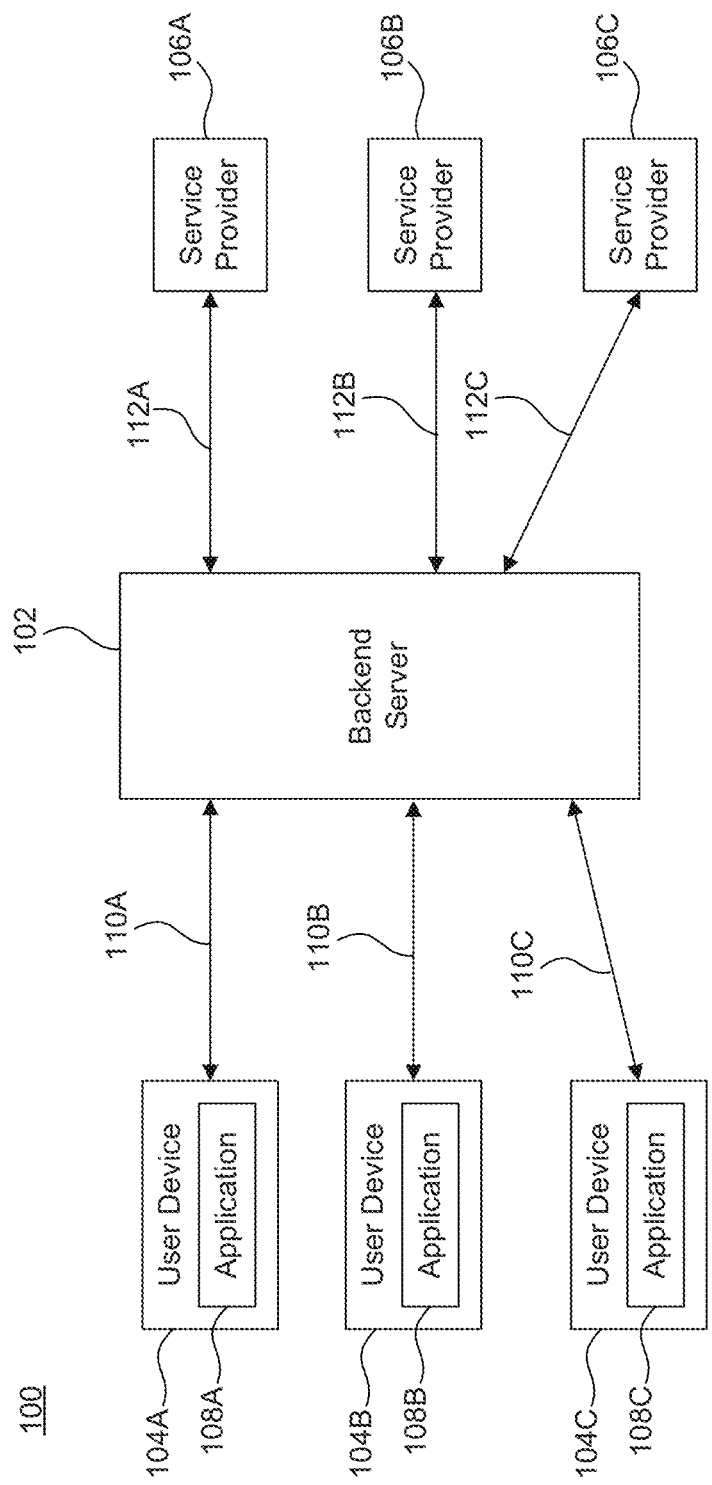
FIG. 1 illustrates a block diagram of a system for automatically updating identification information of a user with service providers, according to some embodiments.

FIG. 1 illustrates a system 100 for automatically updating identification information of a user with service providers, according to some embodiments. In some embodiments, system 100 may include backend server 102, service providers 106A-C, and user devices 106A-C. Backend server 102 may be managed by an entity (e.g., a banking institution), which may be associated with a wide range of users having accounts (e.g., bank accounts) with the entity. As such, the accounts may be associated with profiles unique to the users. Thus, backend server 102 may maintain several (e.g., hundreds) profiles unique to users.

Backend server 102's profiles may contain identification information unique to the users. Identification information may be determined by backend server 102, received by service providers 106A-C, and/or provided by users via user devices 106A-C. As such, identification information may include any type of information describing the identity of the user. Accordingly, identification information may include a full name, a home address, a work address, a personal email address, a social security number, passport number, a driver's license number, a credit card number, a date of birth, a telephone number, log in credentials (e.g., username and password), a race, a nationality, an ethnicity, and an origin, just to name a few examples.

Backend server 102's profiles may also contain identifiers unique to the users ("user identifiers"). Backend server 102 may assign the user identifiers, for example, upon creation of respective user profiles. User identifiers may not be shared with external entities, including user devices 104A-C and service providers 106A-C. As such, user identifiers may permit backend server 102 to quickly and efficiently identify particular users.

As will be discussed in more detail below, backend server 102's profiles may also contain identifiers unique to the connection between backend server 102 and service providers 106A-C and to the users ("connection identifiers"). As such, for the same service provider (e.g., service provider 106A), backend server 102 may have different connection identifiers for each user and for each service provider for a particular user. The connection identifiers may be created by backend server 102, for example, upon receiving an indication (e.g., a message) from service providers 106A-C that identification information of a user sent by the backend server 102 to service providers 106A-C sufficiently describes a user for which service providers maintain a profile. This may allow the backend server 102 to quickly and efficiently identify, not only a connection between the backend server 102 and a particular service provider 106A-C, but also a particular user having a profile stored at the backend server 102 and the particular service provider 106A-C.

Backend server 102 may provide computer applications 108A-C to allow users to wirelessly access and update their profiles. As such, user devices 104A-C may download and/or store computer application 108A-C and may thus be communication with backend server 102 over public communication lines or mediums 110A-C. User devices 104A-C may be managed by a different entity from that managing backend server 102. As such, user devices 104A-C may be a device belonging to the users (e.g., a mobile phone). User devices 104A-C may be a personal digital assistant (PDA), a desktop workstation, a laptop or notebook computer, a netbook, a tablet, a smartphone, smartwatch, or any other type of handheld device.

Backend server 102's computer applications 108A-C may permit users to send updated identification information to service providers 106A-C. The identification information may be saved in backend server 102's profile for the user or upon receipt from backend server 102, sent directly to service providers 106A-C without saving in the user's profile. In some embodiments, before sending and/or saving updated identification information, backend servers 102 may authenticate the identification information. As such, backend server 102's level of authentication of identification information may be greater than that of the service providers 106A-C.

As such, after receiving a request from a user to send updated identification information to service providers 106A-C, backend server 102 may send one or more pieces of identification information to the service providers 106A-C so that service providers 106A-C can verify storage of a profile corresponding to the user. In doing so, service providers 106A-C may request additional pieces of identification information to verify the profile of the user. Along these lines, service providers 106A-C may request an answer to a security question (e.g., provided by the user at service providers). Only after receiving an answer from backend server 102 and confirming that the answer is correct, service providers 106A-C provide an indication to backend server 102 that the identity information of the user is sufficient. Accordingly, after receiving an indication from service providers 106A-C that the identity information of the user sent to service providers 106A-C is sufficient, backend server 102 may send an identifier—unique to communication between the backend server 102 and service providers 106A-C and to the user ("connection identifiers")—to the service providers 106A-C. The connection identifier may be sent before or along with the updated identification information.

As noted above, the connection identifier may allow backend server 102 to quickly and efficiently identify, not only a connection between the backend server 102 and a particular service provider 106A-C, but also a particular user having a profile stored at the backend server 102 and the particular service provider 106A-C. Accordingly, after creating the connection identifier, backend server 102 may associate the connection identifier with the user. As such, the user may continue to send updated identification information to the particular service provider 106A-C at later times, and backend server 102 may be able to quickly identify the user and the particular service provider 106A-C based on the connection identifier.

Backend server 102 may thus be in communication with service providers 106A-C over private communication lines or mediums 112A-C. Service providers 106A-C may be any entity—different from the entity managing the backend server 102—that stores profiles of users who also have profiles stored by backend server 102. As such, service providers 106A-C profiles for users may contain identification information different and/or the same as identification information contained by corresponding profiles of users maintained by backend server 102.

In addition to identification information, like backend server 102, service providers 106A-C profiles may contain identifiers unique to the users ("user identifiers"). The user identifiers may be provided by the entity managing the service providers 106A-C and thus be different from the user identifiers provided by the backend server 102. The service providers 106A-C user identifiers may not be shared with external entities, including backend server 102 and user devices 104A-C. The user identifiers may permit service providers 106A-C to quickly and efficiently identify particular users internally.

Service providers 106A-C profiles may also contain the connection identifiers generated by backend server 102. As discussed above, service providers 106A-C may receive the connection identifiers from backend server 102 after sending an indication (e.g., a message) to backend server 102 that the identification information of a user sent from backend server 102 to service providers 106A-C sufficiently describes a user for which the service providers 106A-C maintain a profile. Accordingly, like backend server 102, the connection identifiers may assist service providers 106A-C in identifying users in subsequent messages from backend server 102.

Along these lines, upon receiving the connection identifier backend server 102, service providers 106A-C may send a request to backend server 102 to receive updated identification information. The request may include the connection identifier so that backend server 102 may quickly and efficiently identify the particular service provider 106A-C and the user associated therewith.

Figure 2A:
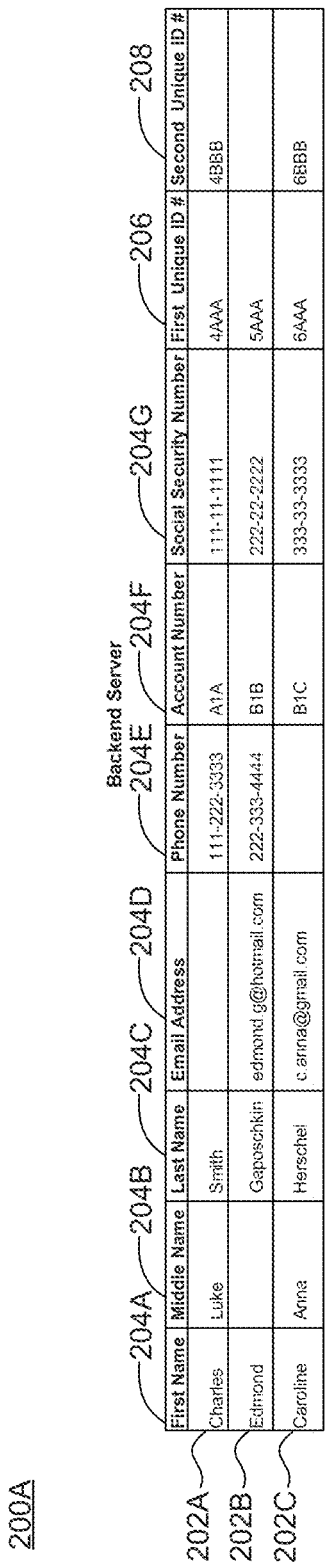

FIGS. 2A and 2B illustrate example data 200A/200B stored in profiles for users 202A-C maintained by backend server 102 and service provider 106A (of FIG. 1).

FIG. 2A illustrates data 200A stored in profiles for users 202A-C maintained by backend server 102 (of FIG. 1). As illustrated, backend server 102 may store identification information 204A-J for users 202A-C in their respective profiles. As such, for users 202A-C, backend server 102 may store different identification information 204A-G. For example, for user 202A, backend server 102 may store identification information 204A-C/204E-J. In contrast, for user 202B, backend server 102 may store identification information 202A/202C-G and, for user 202C, backend server 102 may store identification information 202A-D/202F-G.

Data 200A stored in profiles for user 202A-C maintained by backend server 102 (of FIG. 1) may also include identifiers 206/208. Upon the creation of the profiles for the users 202A-C, backend server 102 may create and/or assign users 202A-C identifiers 206 unique to the users ("user identifiers"). For example, as illustrated, users 202A-C may be assigned user identifiers "4AAA," "5AAA," and "6AA," respectively. As discussed above, user identifiers 206 may not be shared with service providers 106A-C (of FIG. 1). Rather, user identifiers 206 may solely be used by backend server 102 to identify users 202A-C. As such, by having a single unique identifier associated with users 202A-C, backend server 102 may more quickly and efficiently identify the users 202A-C and their identification information 204A-G.

Likewise, as stated above, upon receiving an indication from service provider 106A that a message sent by backend server 102 sufficiently describes the users 202A-C, backend server 102 may create and/or assign connection identifiers 208 unique to the connection between backend server 102 and service providers 106A-C and to the users ("connection identifiers"). For example, as illustrated, users 202A and 202C may be assigned connection identifiers "4BBB" and "6BBB," respectively. Connection identifiers 208 may be used by service provider 106A to reference users 202A-C. Thus, for requests from backend server 102 to service provider 106A (or vice versa) to receive updated identification information, connection identifiers 208 may assist identification of the appropriate user. For example, when the backend server 102 sends updated identification information 204B ("Luke") for user 202A to service provider 106A, backend server 102 may also send unique identifier 208 ("4BBB") for the connection to service provider 106A with respect to user 202A. This will allow the service provider 106A to quickly and efficiently identify that the updated identification information 204 pertains to user 202A.

Similarly, when backend server 102 receives a request from service provider 106A to update identification information 202F (of FIG. 2B), the service provider 106A may also receive connection identifier 208A ("4BBB") associated with respect to user 202A. This allows backend serer 102 and service provider 106A to quickly identify the users for which identification information is sought to be updated.

FIG. 2B illustrates data 200B stored in profiles of users 202A-C maintained by service provider 106A (of FIG. 1). As shown, for users 202A-C, service provider 106A may store identification information 204A-C/204E/204G-H in the respective profiles. As such, like backend server 102 (of FIG. 1), for users 202A-C, service provider 106A may store different identification information 204A-C/204E/204G-H. For example, for users 202A and 202B, service provider 106A may store identification information 204A/204C/ 204H-I. And, for user 202C, service provider 106A may store identification information 204A/204C/204E/204H-I.

Along these lines, for users 202A-C, service provider 106A's (of FIG. 1) may store identification information different and/or the same than that of backend server 102 (of FIG. 1). For example, for user 202A, service provider 106A and backend server 102 may both store identification information 204A/204C. However, for user 202A, service provider 106A may also store identification information 202H-I, and backend server 102 may also store identification 204E-G.

Data 200B stored in profiles for user 202A-C maintained by service provider 106A (of FIG. 1) may also include identifiers 208/210. Upon the creation of profiles, service providers may create and/or assign identifiers 210 unique to the users ("user identifiers"). User identifiers 210 may be created and/or assigned by the entity managing service provider 106A and may not be shared with backend server 102. Rather, identifiers 210 may solely be used by service provider 106A to identify users 202A-C. As such, by having unique identifiers 210 associated with users 202A-C, service provider 106A may more quickly and efficiently identify the users 202A-C and their identification information 204A-G.

As described above, backend server 102 (of FIG. 1) generates identifiers 208 unique to the connection between backend server 102 and service providers 106A (of FIG. 1) and to the users ("connection identifiers"). The service provider 106A may receive a copy of the connection identifiers from the backend server 102 and associate the connection identifiers 208 with the profiles of the corresponding users 202A-C. Accordingly, as illustrated, like the profiles of the users 202A-C maintained by backend server 102, the profiles of users 202A-C maintained by service provider 106A may also include the connection identifiers 208. For example, as illustrated, like backend server 102, service provider 106A may maintain profiles for users 202A and 202C including identifier "4BBB" and "6BBB," respectively.

FIGS. 3A-D illustrate an example user interfaces 300A-D of a computer application 108A-C provided by backend server 102 and installed on user devices 104A-C (of FIG. 1).

FIGS. 3A-C illustrate example users interfaces 300A-C provided when a user requests identification information be shared with service providers 106A-C (of FIG. 1). FIG. 3A illustrates a user interface 300A permitting a user to provide updated identification information. As noted above, updated identification information may include new identification information never previously received or a change to existing identification information. As such, the user interface 300A may present a user interface element 302 to share updated identification information. Upon selecting the user interface element 302, FIG. 3B illustrates user interface 300B presenting a list of service providers 106A-C for to share the identification information therewith. After selecting certain service providers 106A-C, FIG. 3C illustrates user interface 300C presenting the various types of identification information that can be shared with the selected service providers 106A-C. As illustrated, in some embodiments, certain identification information may not be shared with any service provider 106A-C or with certain service providers 106A-C.

Figure 3D:
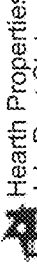

FIG. 3D illustrates a user interface 300D presenting requests 304A-B from service providers 106A-B (of FIG. 1) to receive updated identification information. In some embodiments, the request 304A may include identification information from the service providers 106A-B for the user to confirm that it is up-to-date. In some embodiments, the request 304B may be for receipt of identification information not previously received (e.g., a photo of identification).

Figure 4:
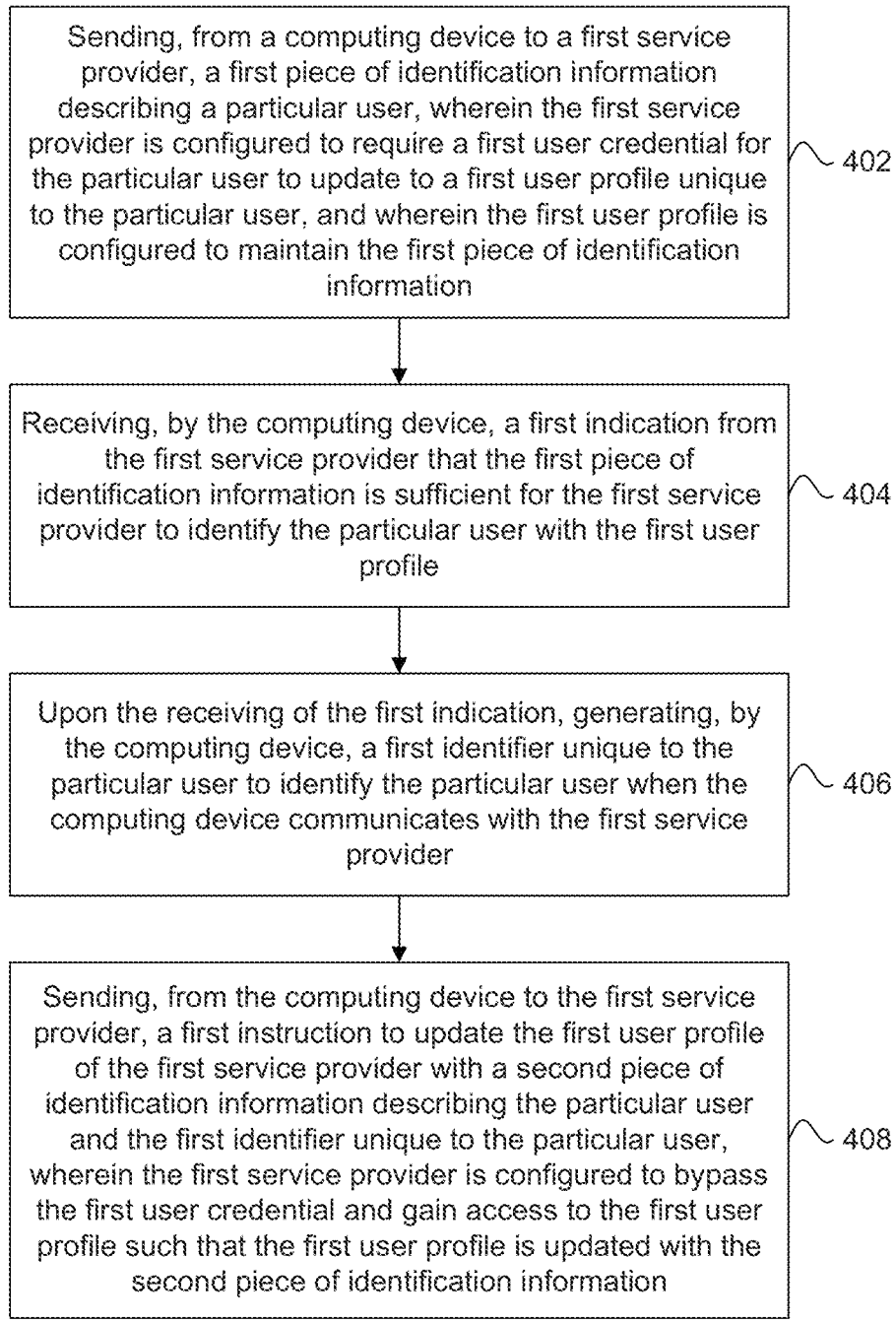
FIGS. 4 and 5 illustrate flowcharts of example methods for updating identification information of a user with service providers, according to some embodiments.
Figure 5:
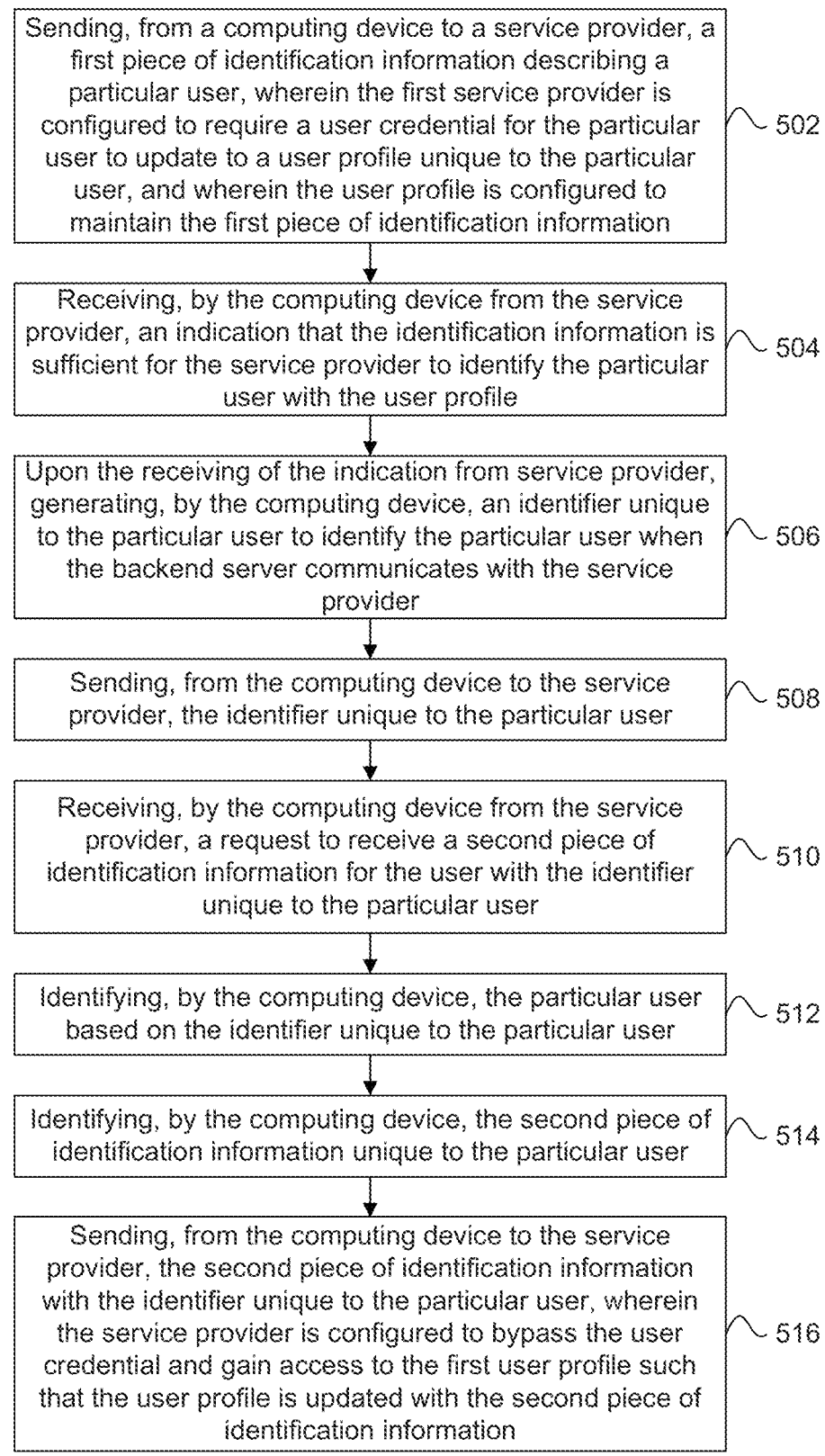

FIGS. 4 and 5 illustrate flowcharts of methods 400/500 for updating identification information of a user with service providers, according to some embodiments. Method 400/500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 4 and 5, as will be understood by a person of ordinary skill in the art.

Referring now to FIG. 4, method 400 shall be described with reference to FIG. 1. However, method 400 is not limited to those example embodiments.

In 402, backend server 102 sends a piece of identification information describing a particular user to a service provider 106A. The service provider requires a user credential (e.g., a user name and password unique to the user) for the user to update to a user profile that is unique to the user and maintains the first piece of identification information. In some embodiments, the service provider requires a multi-factor authentication. The multi-factor authentication may include a combination of two different factors including, for example, something they know, something they have, or something they. For example, the service provider may first request a user credential. After correct entry of the user credential, the service provider may then request a code (numbers and/or letters) sent to their previously-stored email address, texted to their previously-stored mobile phone number or generated by third-party application installed on a registered device.

In some embodiments, a user at user device 104A requests that updated identification information be sent to service provider 106A. As such, the piece of identification information sent to the service provider 106A may be a different piece of identification information to be updated. For example, the piece of identification information sent to the service provider 106A may be an old piece of identification information (as opposed to updated or new).

In 404, backend server 102 receives an indication from the service provider 106A that the identification information is sufficient for the first service provider to identify the particular user with the first user profile.

As such, service provider 106A may determine that the identification information sent by backend server 102 matches stored identification information for the user. In doing so, service provider 106A may determine that the identification information sent by backend server 102 meets or exceeds a predetermined threshold for sufficiently describing the user. For example, the service provider may 104A may initially require at least a first and last name be received from backend server 102. Thus, if backend server 102 sends a first, middle and last name of the user and service provider 106A has only a single user matching the first and last name of the user, service provider 106 may determine that the threshold has been met. Alternatively, if service provider 106A has multiple users with the first and last name (without the middle name) sent by backend server 102, service provider 106A may require additional identification information.

In 406, upon the receiving of the indication from service provider 106A, backend server 102 generates an identifier unique to the particular user to identify the particular user when the backend server 102 communicates with the service provider 106A. Accordingly, the identifier unique to the particular user may assist the backend server 102 when receiving requests from service provider 106A to receive updated identity information for the user. Likewise, the identifier unique to the particular user may assist service provider 106A when receiving requests to update a piece of identify information stored on service provider 106A.

In 408, backend server 102 receives an instruction to update the user profile of service provider 106A with a second piece of identification information that is different from the first piece of identification information. The instruction includes the identifier unique to the user. As previously stated, the service provider 106A may quickly locate the appropriate user's profile. And, in the process, service provider 106A may bypass the credential associated with the user's profile and update the user's profile with the second piece of identification information.

Referring now to FIG. 5, method 500 shall be described with reference to FIG. 1. However, method 500 is not limited to those example embodiments.

In 502, backend server 102 sends a first piece of identification information describing a particular user to a service provider 106A. The service provider is configured to require a user credential for the particular user to update to a user profile unique to the particular user, and wherein the user profile is configured to maintain the first piece of identification information In 504, backend server 102 receives an indication that the identification information is sufficient for the service provider to identify the particular user with the user profile from the service provider 106A.

In 506, upon the receiving of the indication from service provider 106A, backend server 102 generates an identifier unique to the particular user to identify the particular user when the backend server 102 communicates with the service provider 106A.

In 508, backend server 102 sends the identifier unique to the particular user to the service provider 106A.

In 510, backend server 102 receives a request from the service provider 106A to receive a second piece of identification information for the user with the identifier unique to the particular user.

In 512, backend server 102 identifiers the particular user based on the identifier unique to the particular user.

In 514, backend server 102 identifiers the second piece of identification information unique to the particular.

In 516, backend server 102 sends the second piece of identification information with the identifier unique to the particular user to the service provider 106A. The service provider is configured to bypass the user credential and gain access to the first user profile such that the user profile is updated with the second piece of identification information.

Figure 6:
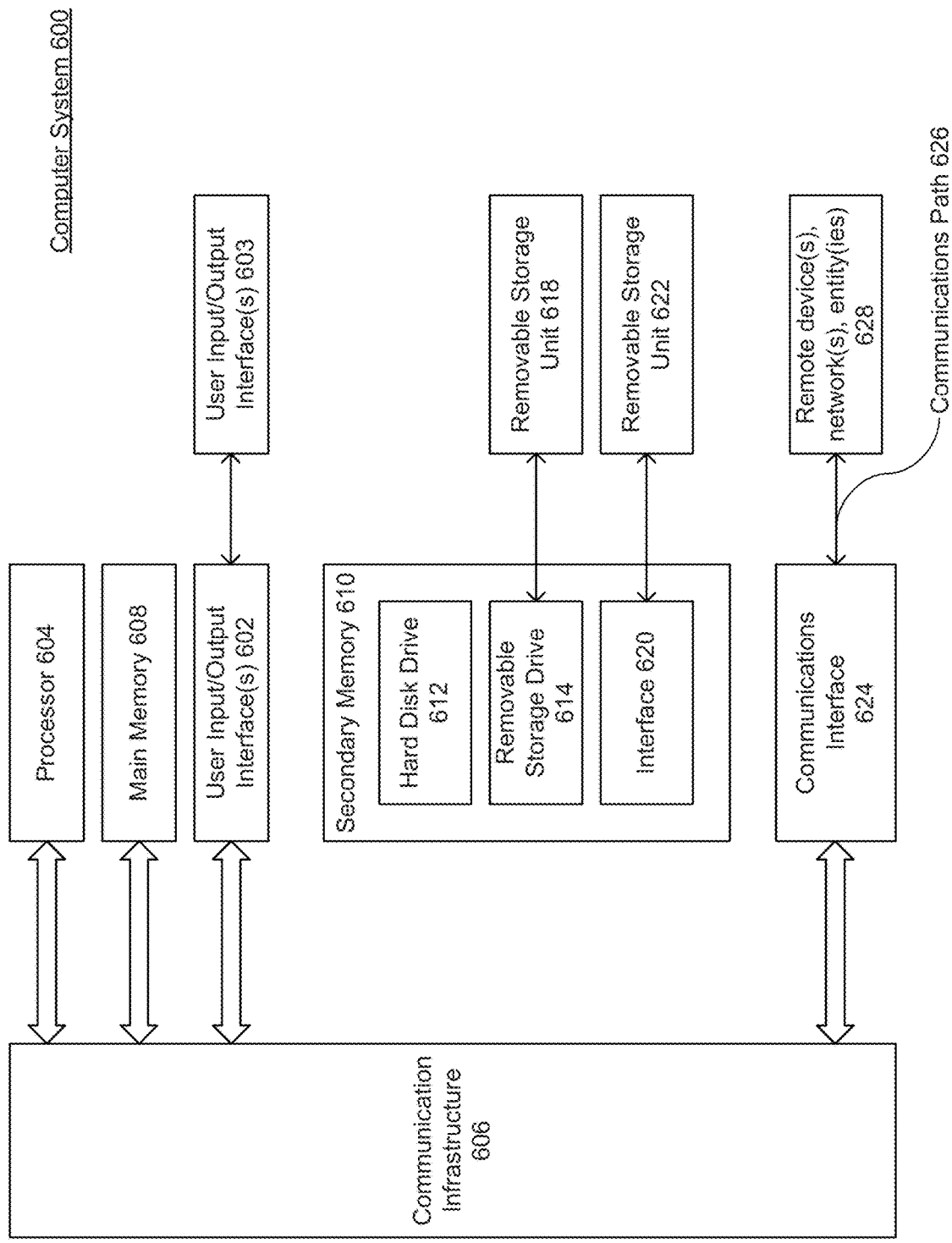
FIG. 6 illustrates an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure or bus 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer-usable or readable storage device having stored thereon computer software (control logic) and/or data. Removable storage unit 618 may be a floppy disk, magnetic tape, compact disk, DVD, optical storage disk, and/ any other computer data storage device. Removable storage drive 614 may read from and/or write to a removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smartphone, smartwatch or another wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A computer-implemented method, comprising:
    sending, from a computing device to a first service provider and a second service provider, a first piece of identification information describing a particular user, wherein the first service provider and the second service provider are configured to require a first user credential and a second user credential for the particular user to update a first user profile and a second user profile unique to the particular user, respectively, and wherein the first user profile and the second user profile are configured to maintain the first piece of identification information;
    receiving, by the computing device, a first indication from the first service provider and a second indication from the second service provider that the first piece of identification information is sufficient for the first service provider and the second service provider to identify the particular user with the first user profile and the second user profile, respectively, wherein the second indication is different from the first indication;
    upon the receiving of the first indication and the second indication, generating, by the computing device, a first identifier unique to the particular user and a second identifier unique to the particular user to identify the particular user when the computing device communicates with the first service provider and the second service provider, respectively, wherein the second identifier is different from the first identifier;
    associating, by the computing device, the particular user with the first identifier unique to the particular user and the second identifier unique to the particular user;
    sending, from the computing device to the first service provider, a first instruction to update the first user profile of the first service provider with a second piece of identification information describing the particular user and the first identifier unique to the particular user; and
    sending, from the computing device to the second service provider, a second instruction to update the second user profile of the second service provider with the second piece of identification information and the second identifier unique to the particular user,
    wherein:
        the second piece of identification information is different from the first piece of identification information, and
        the first service provider and the second service provider are configured to bypass the first user credential and the second user credential and gain access to the first user profile and the second user profile, respectively, such that the first user profile and the second user profile are updated with the second piece of identification information.

2. The computer-implemented method of claim 1, further comprising:
    receiving, by the computing device, the first piece of identification information;
    storing, by the computing device, the first piece of identification information; and
    authenticating, by the computing device, the first piece of identification information as being unique to the particular user,
    wherein the authentication of the first piece of identification information is prior to the sending of the first piece of identification information to the first service provider.

3. The computer-implemented method of claim 2, wherein the authentication of the first piece of identification information is performed by the computing device and has an equal or higher level of authentication than an authentication performed by the first service provider on the first piece of identification information.

4. The computer-implemented method of claim 1, wherein the first user credential includes a username and password unique to the particular user.

5. The computer-implemented method of claim 1, wherein the first piece of identification information is not sent with the second piece of identification information and the first identifier unique to the user to update the first user profile maintained by the first service provider.

6. The computer-implemented method of claim 1, further comprising:
    receiving, by the computing device, a security question from the first service provider; and
    sending, from the computing device to the first service provider, an answer to the security question,
    wherein:
        the first service provider is configured to determine if the answer to the security question is a correct answer, and
        the receiving of the first indication from the first service provider is based on the answer to the security question being the correct answer.

7. The computer-implemented method of claim 1, further comprising:
    generating, by the computing device, the first identifier unique to the particular user based on the first piece of identification information.

8. The computer-implemented method of claim 1, further comprising:
    sending, from the computing device to the second service provider, a third instruction to update the second user profile with the second identifier and the second piece of identification information,
    wherein:
        the third instruction is different from the second instruction, and the second service provider is configured to bypass the second user credential and gain access to the second user profile of the second user profile such that the second user profile is updated with the second piece of identification information.

9. The computer-implemented method of claim 1, further comprising:
receiving, by the computing device, a request from the first service provider to receive a third piece of identification information describing the particular user;
receiving, by the computing device, an authorization from a user to send the third piece of identification information to the first service provider; and
sending, from the computing device to the first service provider, a second instruction to update the first user profile of the first service provider with the third piece of identification information,
wherein:
the second instruction includes the first identifier unique to the particular user, and
the first service provider is configured to bypass the first user credential and gain access to the first user profile such that the first user profile is updated with the third piece of identification information.

10. The computer-implemented method of claim 9, further comprising:
after receiving the request from the first service provider, receiving, by the computing device, the third piece of identification information from the user.

11. The computer-implemented method of claim 1, wherein the first piece of identification information and the second piece of identification information are a name, a phone number, an email address, a race, a nationality, an ethnicity, an origin, a home address, a work address, a mobile phone number, a home phone number, a primary phone number, a secondary phone number, or an image of the particular user.

12. A system, comprising:
a memory configured to store operations; and
one or more processors configured to perform the operations, the operations comprising:
sending, from a computing device to a first service provider and a second service provider, a first piece of identification information describing a particular user, wherein the first service provider and the second service provider are configured to require a first user credential and a second user credential for the particular user to update a first user profile and a second user profile unique to the particular user, respectively, and wherein the first user profile and the second user profile are configured to maintain the first piece of identification information;
receiving, by the computing device, a first indication from the first service provider and a second indication from the second service provider that the first piece of identification information is sufficient for the first service provider and the second service provider to identify the particular user with the first user profile and the second user profile, respectively, wherein the second indication is different from the first indication;
upon the receiving of the first indication and the second indication, generating, by the computing device, a first identifier unique to the particular user and a second identifier unique to the particular user to identify the particular user when the computing device communicates with the first service provider and the second service provider, respectively, wherein the second identifier is different from the first identifier;
associating, by the computing device, the particular user with the first identifier unique to the particular user and the second identifier unique to the particular user;
sending, from the computing device to the first service provider, a first instruction to update the first user profile of the first service provider with a second piece of identification information describing the particular user and the first identifier unique to the particular user; and
sending, from the computing device to the second service provider, a second instruction to update the second user profile of the second service provider with the second piece of identification information and the second identifier unique to the particular user,
wherein:
the second piece of identification information is different from the first piece of identification information, and
the first service provider and the second service provider are configured to bypass the first user credential and the second user credential and gain access to the first user profile and the second user profile, respectively, such that the first user profile and the second user profile are updated with the second piece of identification information.

13. The system of claim 12, the operations further comprising:
receiving, by the computing device, the first piece of identification information;
storing, by the computing device, the first piece of identification information; and
authenticating, by the computing device, the first piece of identification information as being unique to the particular user,
wherein the authentication of the first piece of identification information is prior to the sending of the first piece of identification information to the first service provider.

14. The system of claim 13, wherein the authentication of the first piece of identification information is performed by the computing device and has an equal or higher level of authentication than an authentication performed by the first service provider on the first piece of identification information.

15. The system of claim 12, wherein the first user credential includes a username and password unique to the particular user.

16. The system of claim 12, wherein the first piece of identification information is not sent with the second piece of identification information and the first identifier unique to the user to update the first user profile maintained by the first service provider.

17. The system of claim 12, the operations further comprising:
generating, by the computing device, the first identifier unique to the particular user based on the first piece of identification information.

18. A computer-readable storage device having instructions stored thereon, execution of which, by one or more processing devices, causes the one or more processing devices to perform operations comprising:

sending, from a computing device to a first service provider and a second service provider, a first piece of identification information describing a particular user, wherein the first service provider and the second service provider are configured to require a first user credential and a second user credential for the particular user to update a first user profile and a second user profile unique to the particular user, respectively, and wherein the first user profile and the second user profile are configured to maintain the first piece of identification information;

receiving, by the computing device, a first indication from the first service provider and a second indication from the second service provider that the first piece of identification information is sufficient for the first service provider and the second service provider to identify the particular user with the first user profile and the second user profile, respectively, wherein the second indication is different from the first indication;

upon the receiving of the first indication and the second indication, generating, by the computing device, a first identifier unique to the particular user and a second identifier unique to the particular user to identify the particular user when the computing device communicates with the first service provider and the second service provider, respectively, wherein the second identifier is different from the first identifier;

associating, by the computing device, the particular user with the first identifier unique to the particular user and the second identifier unique to the particular user;

sending, from the computing device to the first service provider, a first instruction to update the first user profile of the first service provider with a second piece of identification information describing the particular user and the first identifier unique to the particular user; and sending, from the computing device to the second service provider, a second instruction to update the second user profile of the second service provider with the second piece of identification information and the second identifier unique to the particular user, wherein:
the second piece of identification information is different from the first piece of identification information, and the first service provider and the second service provider are configured to bypass the first user credential and the second user credential and gain access to the first user profile and the second user profile, respectively, such that the first user profile and the second user profile are updated with the second piece of identification information.

* * * * *